ELECTRONIC FUNCTION GENERATOR OF A PLURALITY OF VARIABLES

Filed Aug. 26, 1954 4 Sheets-Sheet 1

INVENTORS
HANS F. MEISSINGER
RAWLEY D. McCOY
BY
Brumbaugh, Ryan & Hicks
ATTORNEYS INVENTORS
HANS F. MEISSINGER
RAWLEY D. McCOY
BY
Burgess, Ryan & Hicks
ATTORNEYS

ELECTRONIC FUNCTION GENERATOR OF A PLURALITY OF VARIABLES

Filed Aug. 26, 1954 4 Sheets-Sheet 3

INVENTORS
HANS F. MEISSINGER
RAWLEY D. Mc COY
BY
Burgess, Ryan & Hicks
ATTORNEYS Aug. 11, 1959 H. F. MEISSINGER ET AL 2,899,550

ELECTRONIC FUNCTION GENERATOR OF A PLURALITY OF VARIABLES

Filed Aug. 26, 1954 4 Sheets-Sheet 4

INVENTORS
HANS F. MEISSINGER
RAWLEY D. McCOY
BY
Burgess, Ryan & Hicks
ATTORNEYS

United States Patent Office 2,899,550

Patented Aug. 11, 1959

2,899,550

ELECTRONIC FUNCTION GENERATOR OF A PLURALITY OF VARIABLES

Hans F. Meissinger, Forest Hills, and Rawley D. McCoy, Bronxville, N.Y., assignors to Reeves Instrument Corporation, New York, N.Y., a corporation of New York Application August 26, 1954, Serial No. 452,432

9 Claims. (Cl. 250—27)

This invention relates to electronic computing equipment and relates more particularly to an improved method and apparatus for electronically generating a voltage corresponding to a prescribed function of one or more independent variables.

An object of the present invention is to provide an improved method and apparatus for electronically generating functions of two independent variables and wherein the procedure may be substantially simultaneously repeated with additional variables to provide a final output voltage corresponding to the function of more than two independent variables.

A further object of the invention is to provide an electronic function generator of the character set forth wherein a plurality of independent units may be employed that may be interconnected and adjusted to meet the requirements of a specific functional relationship.

Function generators for functions of two variables heretofore in use depended on servo equipment driving mechanical or electrical cams, or tapped linear potentiometers. This has the inherent disadvantage of time consuming preparation, inflexibility and high cost per unit. In addition, the use of servos restricts the operating speed. Electronic function generators of the photoformer variety cannot be applied directly to the task of shaping functions of two variables. The indirect method of breaking up a function of two variables into a combination of functions of a single variable by analytical means in general requires considerable effort. It depends largely on intuition inasmuch as a systematic method for the decomposition of such functions does not exist. The present invention overcomes the above difficulties and provides a highly simplified, flexible, high speed and accurate method and means for electronically generating a variable voltage corresponding to a function of one or more independent variables that can be represented by or reduced to families of curves having portions of equal slope or substantially equal slope in certain ranges of the independent variables. Apparatus embodying the present invention can be manufactured at low cost, has a high degree of reliability and it has sufficient flexibility to handle a wide variety of such functions.

Other objects and advantages of the invention will become more apparent from the following description and accompanying drawings forming part of this application.

Figure 1:
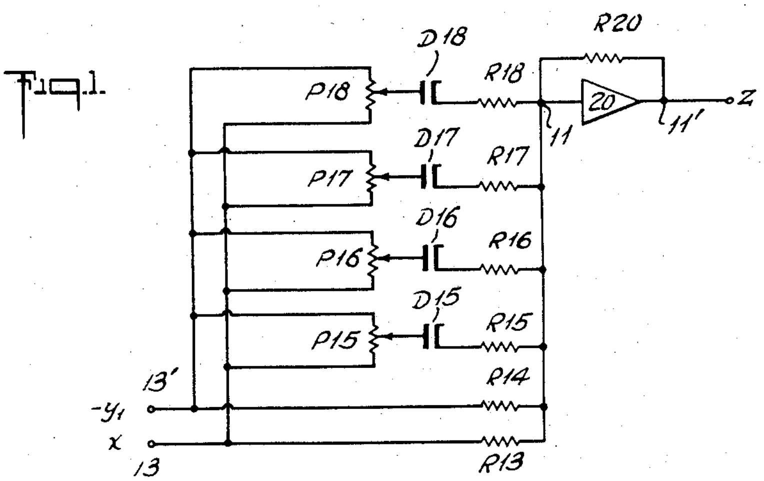
Fig. 1 is a circuit diagram of a simplified function generator in accordance with the invention.
Figure 4:
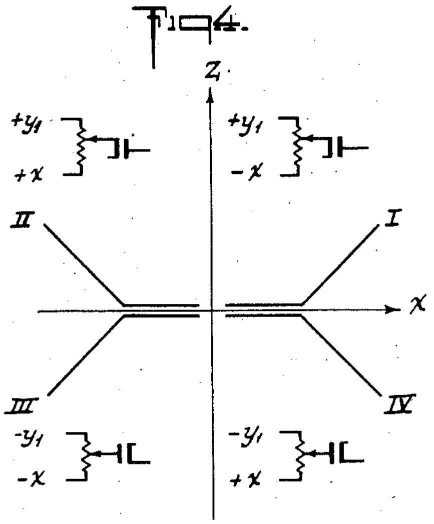
Figure 6:
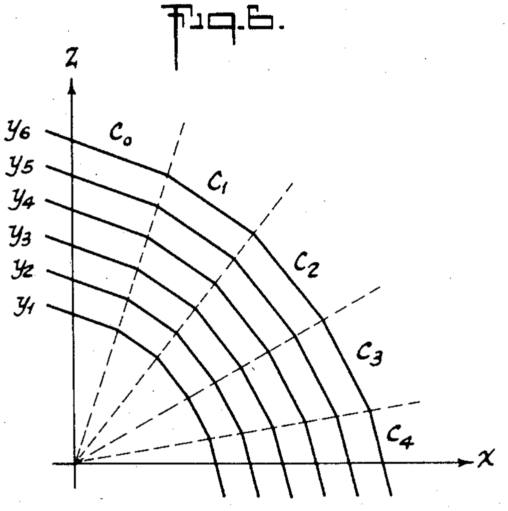
Figure 5A:
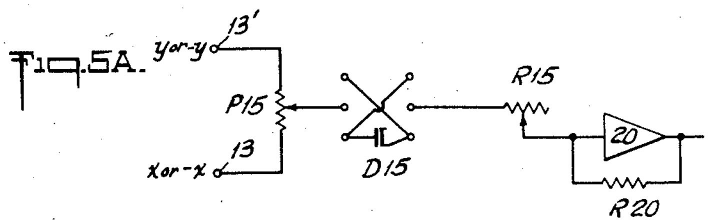
Figures 5B, 7:
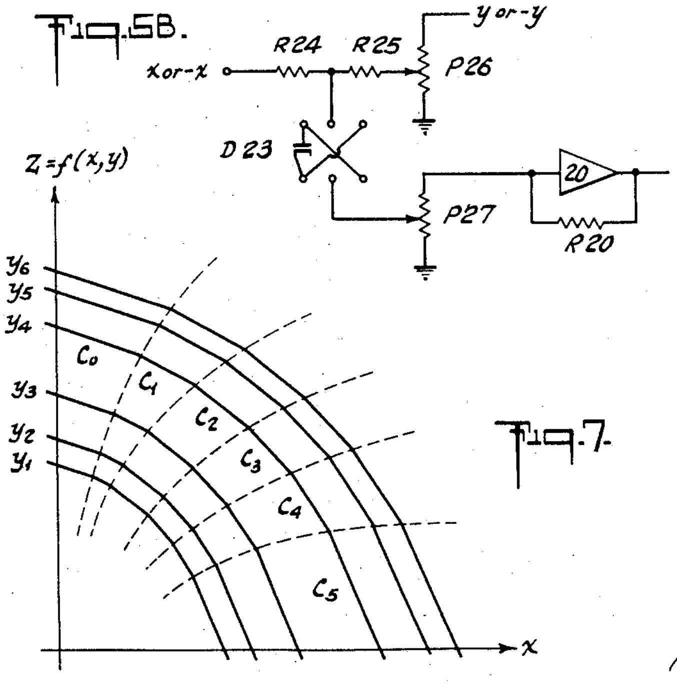
Figure 8:
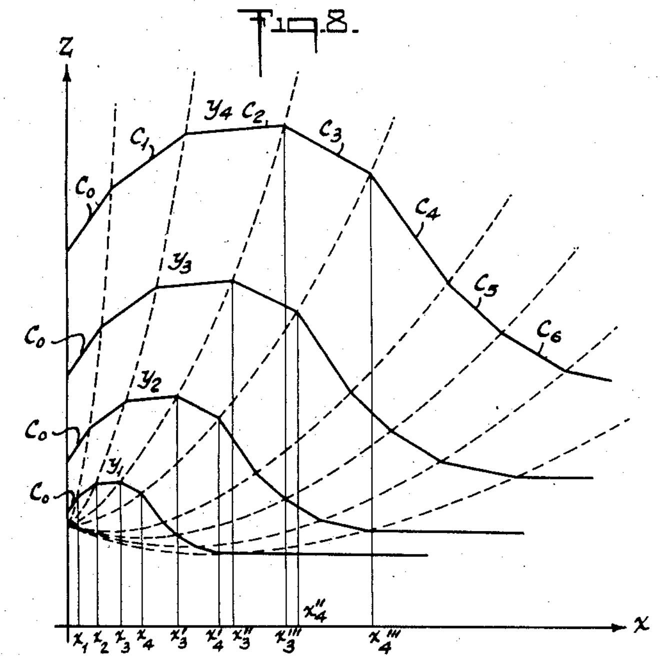
Figures 9, 10:
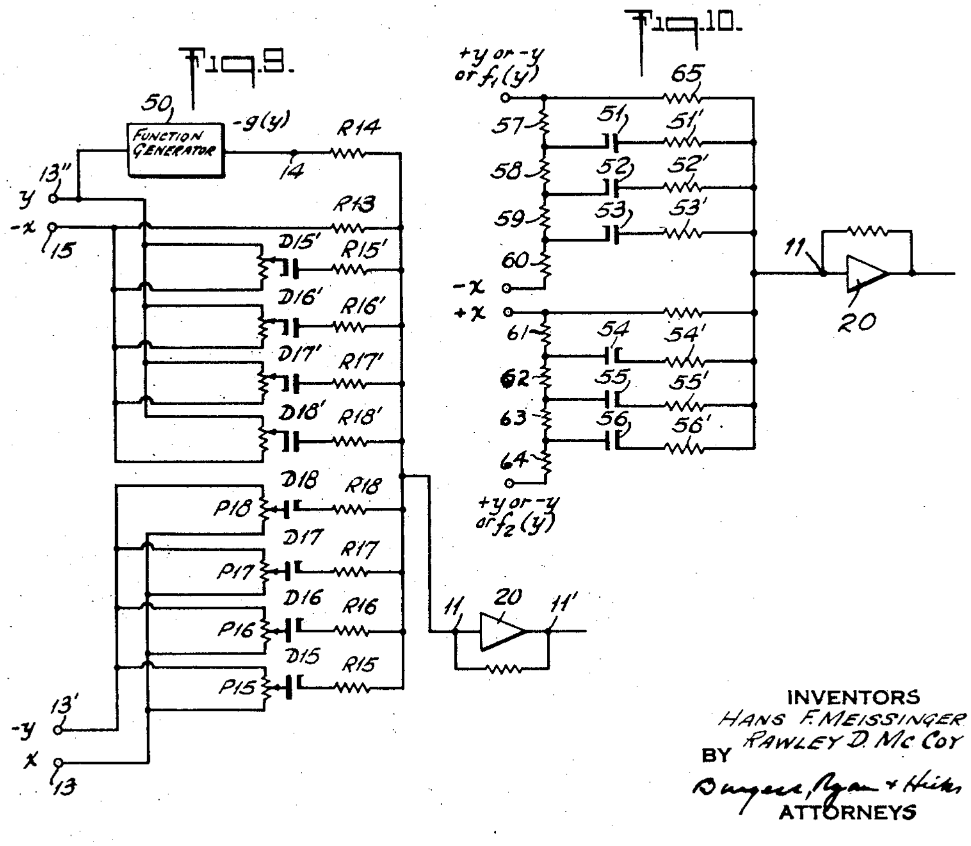

Fig. 4 graphically illustrates the various slopes or contributions that may be obtained by varying polarity of the variables and interchanging rectifier connections;

Figs. 5A and 5B illustrate two different circuits for diode channels in accordance with the invention;

Fig. 6 is a family of curves generated by two independent variables through the use of a function generator as shown in Fig. 1;

Fig. 7 is a family of curves similar to that of Fig. 6 but wherein the variables have non-linear boundaries;

Fig. 8 is a family of curves representing a function of non-monotonic character having non-linear boundaries;

Fig. 9 is a circuit diagram of a modified embodiment of Fig. 1 for producing functions such as that illustrated in Fig. 8;

Fig. 10 is a modified embodiment of the invention shown in Figs. 1 and 9; and

Figure 11:
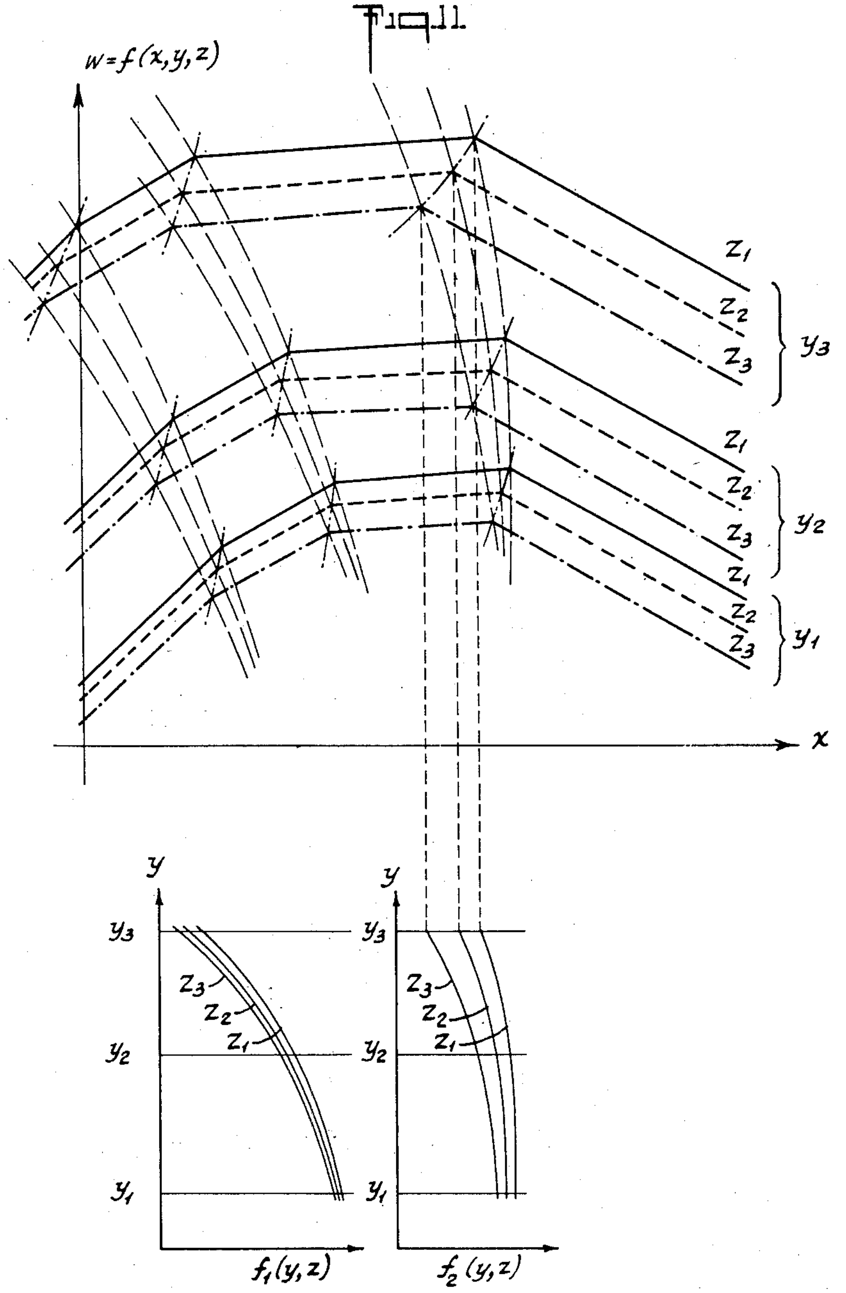

Fig. 11 is a family of curves representing a function generated by three independent variables with apparatus in accordance with the invention.

Reference is now made to the drawings and specifically to Figure 1 illustrating a circuit diagram of one of the basic forms of the function generator. The circuit comprises a number of channels arranged in parallel and comprising potentiometers P15 to P18, diode rectifiers D15 to D18, and series resistors R15 to R18. The series resistors are connected to the summing junction 11 of a D.C. feedback amplifier 20. Additional input channels, having series resistors R13 and R14, do not contain diodes and are also connected to the summing junction 11. The feedback amplifier 20 and resistor R20 are shown as part of the function generator for convenience of discussion. It is apparent however that instead of the amplifier other suitable output devices may be employed.

Prior to a discussion of circuits of this type for generating functions of two variables, their application to functions of a single variable will be described. In the circuit diagram of Figure 1, a variable positive voltage $x$ is applied to the input terminal 13 to which one terminal of each of the potentiometers P15, P16, P17, P18 is connected. The remaining terminals of each potentiometer are connected to a common point 13' to which a fixed negative bias $-y_1$ is applied. In addition, the voltages $x$ and $-y_1$ are applied to the input resistors R13 and R14, respectively.

Figure 2:
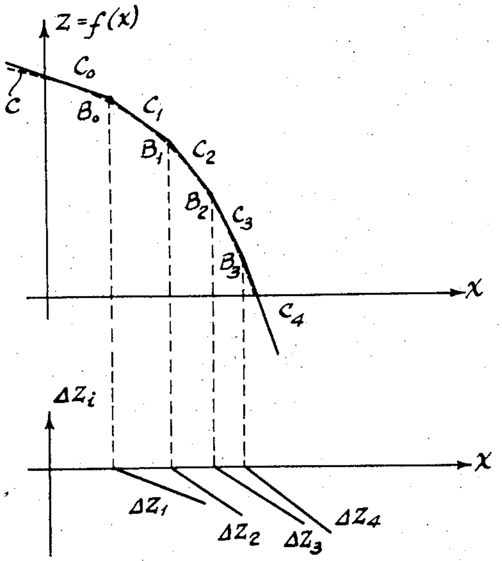
Fig. 2 shows the generation of a single curve as a function of one independent variable to illustrate the operation of the circuit of Fig. 1.

In Figure 2, the output voltage $z$ of the amplifier 20 is shown as a function of $x$. The output voltage $z$ consists of straight line segments $C_0$, $C_1$, $C_2$, $C_3$ and $C_4$ which are joined at the breakpoints $B_0$, $B_1$, $B_2$, and $B_3$ to form an approximation of the smooth curve C. The first segment $C_0$ represents the output of the circuit under a condition where none of the diodes D15 to D18 are conducting, i.e. for small positive values of $x$. The slope of this segment is, of course, negative as a result of the inversion of the voltage in the amplifier 20. As the input voltage $x$ increases a condition is reached where one of the diodes, e.g. D15, begins to conduct. This occurs when the voltage at the potentiometer arm of P15 changes from a negative to positive value. Since the plate of the diode rectifier is connected to the potentiometer arm the diode will conduct and the input impedance of the amplifier 20 decreased. This action results in the generation of the next segment, $C_1$, having a steeper slope than $C_0$. With further increases in $x$ additional diode channels become conductive so that the curve $z$ vs. $x$ passes through increasingly steeper segments $C_2$, $C_3$, $C_4$.

Figure 3A:
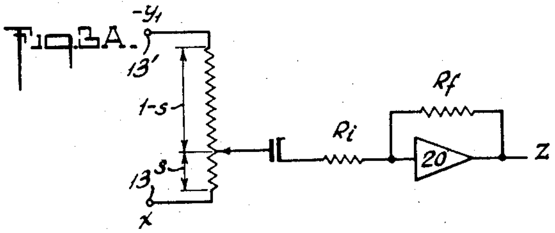
Fig. 3A shows a single diode channel of the circuit of Fig. 1.
Figure 3B:
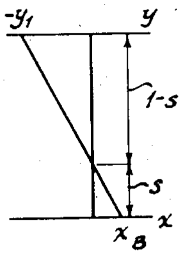
Fig. 3B is a diagram showing the potential distribution on the potentiometer of Fig. 3A to illustrate one of the principles of the operation of the generator.

The contributions of the individual diode channels to the total output voltage $z$ are plotted separately at the bottom of Figure 2, as functions of $x$ and are denoted by $\Delta Z_1$ to $\Delta Z_4$. These contributions are lines having zero slopes at voltages below the breakpoints B and negative slopes at voltages above the breakpoints. The potentiometer settings of P15, P16, P17 and P18 determine the breakpoints B and, together with the series resistors R15, R16, R17, R18, the slopes of the individual contributions. Denoting the setting of the potentiometer by $s$, the series resistance by $R_i$, and the feedback resistance of the amplifier 20 by $R_f$, the breakpoint and slope of the voltage contribution of a single diode channel (see Figs. 3A and B) may be computed as follows:

$$\text{Breakpoint voltage } x_B=\frac{s}{1-s}y_1$$

$$\text{Incremental slope } m=-\frac{R_f}{R_i}(1-s)$$

In the computation of the slope, the loading of the potentiometer output voltage by the current through $R_i$ has been neglected. A family of curves which take the loading effect into account may be used as an aid in producing a desired function directly by dial settings of the potentiometers. In a practical application the breakpoints and slopes may be adjusted by experiment in order to fit a given curve $z=f(x)$ with the desired accuracy. This can be carried out by starting from small values of $x$ and proceeding from one segment to the next with increasing $x$, in each case adjusting first the potentiometer setting to obtain the correct breakpoint, and then the series resistance to obtain the correct slope.

Although the basic circuit illustrated in Figure 1 shows only four diode channels a larger number of channels may be used in the function generator whenever a smoother and more accurate representation of a desired curve is needed.

It is also evident that by using input voltages $x$ and $y_1$ having different polarities than those previously indicated and by reversing the diode connections voltage contributions having positive rather than negative slope increments may be obtained. Finally, by proper choice of the polarity of input voltages and of the sense of diode connection it is possible to obtain contributions in any of the four quadrants of the $x$—$z$ plane, as shown in Figure 4. In this diagram the different arrangements yielding the four different slopes are indicated in the respective quadrants.

From the foregoing it can be seen that a function generator which is required to yield curves with positive and negative slope increments must contain diode channels in which the cathode is connected to the potentiometer as well as diode channels in which the plate is connected to the potentiometer. To make the function generator completely flexible it is desirable to provide variable input resistors R15 to R18, as well as variable voltage dividers P15 to P18, and to have the diode connected in reversible manner by means of double-pole double-throw switches as shown in Figure 5A.

A modification of the basic diode channel is shown in Figure 5B. In this arrangement, the input voltage $x$ or $-x$ is applied to one end terminal of a voltage divider consisting of two fixed resistors R24 and R25. The other end terminal is connected to the arm of a potentiometer P26 which is connected between a $-y$ or $+y$ input, and ground. The junction of R24 and R25 is connected through the diode D23 and its associated reversing switch to the arm of a second potentiometer P27. One end of the potentiometer P27 is grounded and the other end is connected to the input of a D.C. amplifier 20. This arrangement functions in a manner similar to the one discussed above but has the advantage of complete independence of breakpoints and slope increments, which are controlled by the potentiometers P26 and P27, respectively. Furthermore, the arrangement permits the choice of an arbitrarily small slope increment on potentiometer P27 whereas in the circuit of Figure 5A the slope increment can not be reduced below a value consistent with the maximum series resistance available in the circuit.

The discussion so far has been concerned with the use of basic diode circuits for the task of generating functions of a single variable, $x$. The same principles may be applied to the more complex problem of generating functions of two variables, $x$ and $y$.

Referring again to the circuit of Figure 1, it will now be assumed that the $y$-input voltage, previously held fixed at $-y_1$ is undergoing a change to $-y_2$, $-y_3$, $-y_4$ etc. where each of the successive voltages is chosen more negative than the preceding one. It is clear that with a more negative $y$-input to the potentiometers P15 to P18, proportionately larger positive values of $x$ must be applied to terminal 13 before each of the diodes D15 to D18 will start to conduct. Since the $y$-input is also applied to resistor R14 a direct increase of the output voltage $z$ due to an increase in $y$ results before any of the diodes become conductive. The output voltage $z$ as a function of $x$ and $y$ is plotted in Figure 6 with $x$ as abscissa and fixed values $y_1$, $y_2$, $y_3$, $y_4$, $y_5$ and $y_6$ as parameter. The curve obtained for $y=y_1$ is of course identical with the one presented before in Figure 2. The other curves of the family are displaced images of the first one and may be obtained geometrically by letting the breakpoints $B_0$, $B_1$, $B_2$, $B_3$ move along characteristic loci in a direction away from the origin of the coordinate system, while the segments $C_0$, $C_1$, $C_2$, $C_3$, $C_4$ on the newly generated curves remain parallel to the original segments shown. This is explained by the fact that the incremental slopes remain unaltered by the change in $y$-input whereas the breakpoints are shifted. In the simple case under consideration equal increments in the $y$-input voltage produce equal increments in the breakpoint voltages $x_1$, $x_2$, $x_3$, $x_4$ and, in consequence, all breakpoints are shifted along straight lines which have a common intersection at the origin of the coordinate system. The loci indicating the breakpoint shift with change in $y$ are characterized in Figure 6 by dotted lines. In the following discussion the loci are of great importance and will be referred to as breakpoint lines or boundaries in recognition of the fact that they separate regions in the $x$—$z$ plane in which all C segments have a common slope. The shape of the boundaries, the slope of the segments in the various regions separated by them and the spacing of the breakpoints along the boundaries as a function of the parameter $y$ completely determine the family of curves generated by the circuit, i.e. the function of two variables $z=f(x, y)$ represented by these curves.

It is important to observe that the $x$ and $y$ input voltages enter into the circuit in an entirely equivalent manner, i.e. if $x$ is allowed to vary and $y$ is held constant, $y$ may be considered as the bias voltage for the diodes, while for fixed $x$ and variable $y$ the voltage $x$ assumes the role of bias. A diagram similar to Figure 6 but with $y$ as abscissa and $x$ as a parameter, i.e. a cross-plot of the function shown in Figure 6, may be constructed to bear out this fact geometrically.

A more complex relationship than the one shown in Figure 6 is presented in Figure 7 where the spacing of the curves for $y$=a constant is no longer assumed to be uniform and the breakpoints shift along curved rather than linear boundaries. A variety of cases of this type may be handled by the same function generator if the $y$-input to the diode channels is made to vary as a nonlinear function $g(y)$. This input function may be obtained from any suitable function generator; for example, a separate diode network.

In the most general case, i.e. if the boundaries are entirely unrelated to each other, it may be necessary to use individual $y$-input functions $g_1(y)$, $g_2(y)$, $g_3(y)$ etc. with each diode channel. This will require several function generating circuits but has the advantage of permitting the reduction of an arbitrary function of two variables to a set of functions of a single variable. It may be preferable to apply a non-linear input function to the $x$ rather than the $y$ input terminals as can be determined by cross-plotting the function $z=f(x, y)$. Practical experience with function generators of this type indicates, however, that in many cases a given function $f(x, y)$ can be approximated with sufficient accuracy, without resorting to individual input functions such as $g_1(y)$, $g_2(y)$, $g_3(y)$ etc. This is true because in many cases the shape of the boundary curves may be modified to a certain extent without a significant change in the appearance of the family of curves representing the function $f(x, y)$.

Figure 8 illustrates an example of a function having non-linear boundaries and a non-uniform distribution of breakpoints on the boundaries. This function can be generated by means of the circuit shown in Figure 9. The circuit is similar to the basic circuit of Figure 1 but includes a number of additional channels in which the diodes are connected in reverse, i.e. in a cathode-fed arrangement. Thus, the circuit yields positive as well as negative slope increments as required. The linear input channel containing resistor R13 is fed by the voltage $-x$ so as to produce a positive initial slope at the output of amplifier 20. For fixed values of $y$ the output voltage $z$ as a function of $x$ first rises then falls, and finally levels off for large values of $x$. For $x=0$ the output increases with $y$ in a non-uniform manner which is assumed here to have the character of a parabola, $g(y)=a+by+cy^2$, and may be generated by any suitable generator 50, as for instance the function generator of Figure 1 with positive input $y$ and a fixed negative bias. The voltage $-g(y)$ obtained from this generator 50 is applied to the terminal 14 of the input resistor R14 of amplifier 20 and does not enter the diode channels of the circuit. The $y$-input terminals of all channels having plate-fed diodes are connected to the common terminal 13′ whereas those of the cathode-fed diode channels are connected to terminal 13″. To these terminals the voltages $-y$ and $+y$ respectively are applied. The linear input voltages $+y$ and $-y$ produce a linear variation of breakpoint voltages $x_1$, $x_2$, $x_3$, etc. It is seen from the diagram of $z=f(x, y)$ of Fig. 8 that the uniform shift of breakpoints in $x$ and the non-uniform spacing of the segments $C_0$ resulting from the introduction of the function $g(y)$ produces boundaries of a non-linear character. The boundaries are constructed simply as the loci of intersections of the linear segments $C_0$, $C_1$, $C_2$, etc. with the construction lines erected perpendicular to the abscissa axis at the points $x_1$, $x_2$, $x_3$, etc., and at the points $x_1'$, $x_1''$, etc., $x_2'$, $x_2''$, etc., $x_3'$, $x_3''$, etc., to which the breakpoints are shifted under the influence of the $y$-input. It is seen that the breakpoints thus constructed have a non-uniform distribution on the loci. It is further observed that the same function generator would produce output curves having linear boundaries but non-uniform distribution of breakpoints if voltages proportional to $g(y)$ were inserted as inputs to the common terminals 13′ and 13″ as well as to terminal 14.

While the circuit shown in Fig. 9 will meet a wide variety of requirements, under certain conditions the modified function generator of Figure 10 may be desired. In this form of the invention, the two groups of diodes 51 to 53 and 54 to 56 are connected to multiple-tap voltage dividers constituting resistors 57 to 60 and 61 to 64, respectively. As before, the diodes 51 to 56 are connected through series resistors 51′ to 56′ to the summing junction 11 of the D.C. feedback amplifier 20. This circuit is applicable only when the character of the boundary curves permits the use of common $y$-input voltages. It is not as flexible in design as the circuits previously considered, but has the advantage of greater simplicity and of reduced loading of the voltage sources supplying the $-x$ and $-y$ input voltages. Circuits of this type are preferable in applications requiring special purpose function generators of permanent design.

As was previously pointed out, the invention can be extended to the generation of functions involving more than two independent variables. For instance, in the case of three independent variables $x$, $y$, and $z$, a number of bivariate function generators of the type shown in Figure 1 may be employed to produce shifts in breakpoint voltages $x_B$ as functions of $y$ and $z$. A simple case is illustrated in Figure 11 which shows a two-parametric family of curves in the $x$—$w$ plane, the parameters being $y$ and $z$. The breakpoint produced by a single diode channel is shifted in one direction by changes in $y$, and in a different direction by changes in $z$. The shift in breakpoint voltage as function of $y$ and $z$ is plotted below the $x$—$w$ diagram for two sets of the breakpoints shown and is denoted by $f_1(y, z)$ and $f_2(y, z)$. These functions are generated, as a first step, in the manner discussed before and are then used as input voltages to the next stage of the function generator which yields the complete function $w(x, y, z)$. In certain cases it is sufficient to use one function $f(y, z)$ as a common input to a bivariate function generator forming the second stage.

In the above discussion of the function generator conventional vacuum tube diodes each having a plate and cathode were described. It is apparent however that any suitable type of rectifier or current interrupting means may be employed.

Moreover, while only certain modifications of the invention have been illustrated and described, it is apparent that changes, alterations and modifications may be made without departing from the true scope and spirit thereof.

We claim:

1. A function generator for producing an output voltage which is a predetermined function of the voltages produced by first and second input voltage sources comprising voltage divider means adapted to be energized by voltages derived from said first and second input voltage sources, an output circuit including an amplifier having a feedback resistor connected in parallel therewith, first and second input resistors, means adapted for coupling said first input resistor between said first input voltage source and said output circuit, means adapted for coupling said second input resistor between said second input voltage source and said output circuit, a plurality of unidirectional conducting channels, each of said channels including a diode and series-connected resistive means, and means coupling each of said conducting channels between said voltage divider means and said output circuit.

2. A function generator for producing an output voltage corresponding to a predetermined function of two input voltages comprising first and second input terminals, an output circuit including a feedback amplifier, a first input resistor coupled between said first input terminal and the input of said feedback amplifier, a second input resistor coupled between said second input terminal and the input of said feedback amplifier, and a plurality of diode channels, each of said diode channels having voltage divider means coupled between said first and second input terminals, said voltage divider means being provided with an adjustable tap for varying the voltage between said tap and a common reference point, said diode channels further including a diode and resistor coupled in series between each voltage divider tap and the input of said feedback amplifier.

3. A function generator for producing an output voltage corresponding to a predetermined function of two input voltages comprising first and second input terminals, an output circuit including a feedback amplifier, a first input resistor coupled between said first input terminal and the input of said feedback amplifier, a second input resistor coupled between said second input terminal and the input of said feedback amplifier, and a plurality of diode channels, each of said diode channels including a voltage divider connected between said first and second input terminals and a diode and resistor coupled in series between said voltage divider and the input of said feedback amplifier.

4. A function generator for producing an output voltage corresponding to a predetermined function of two input voltages comprising first and second input terminals, voltage divider means coupled between said input terminals, output circuit means, first and second input resistors each having one end coupled to said output circuit, means coupling the other end of said first input resistor to said first input terminal, means coupling the other end of said second resistor to said second input terminal, a plurality of diode channels each comprising a diode and a series-connected resistor, and means coupling each of said diode channels between said voltage divider means and said output circuit means.

5. In a function generator producing an output voltage representing a predetermined function of first and second applied input voltages, the combination comprising a feedback amplifier having an input and an output, first and second input terminals and a common terminal adapted for receiving said first and second applied voltages, first potentiometer means having end terminals coupled between said first input terminal and said common terminal, second potentiometer means having end terminals coupled between the input of said amplifier and said common terminal, first and second fixed resistors coupled in series between said second input terminal and the arm of said first potentiometer, and an unilateral conductive device coupled between the junction of said first and second series-coupled resistors and the arm of said second potentiometer, the output voltage from said feedback amplifier varying according to a predetermined function of said first and second applied voltages as determined by the setting of said first and second potentiometers.

6. Apparatus for producing an output voltage corresponding to a predetermined function of first and second input voltages comprising first and second input means, said first and second input means each including first and second input terminals and voltage divider means coupled between said input terminals, said first and second input terminals being adapted for receiving voltages having magnitudes corresponding to said first and second input voltages respectively, an output circuit including an amplifier having a feedback resistor connected in parallel therewith, first and second input resistors each having one end coupled to said output circuit, means coupling said first input voltage to the other end of said first resistor, means coupling said second input voltage to the other end of said second resistor, first and second groups of unidirectional conducting channels, each of said channels including a diode and series-connected resistor means, means coupling said first group of conducting channels between the voltage divider means of said first input means and said output circuit, and means coupling said second group of conducting channels between the voltage divider means of said second input means and said output circuit, said first group of unidirectional channels being oppositely polarized with respect to said second group of unidirectional channels.

7. Apparatus as defined in claim 6 wherein said means coupling said first input voltage to the other end of said first resistor comprises function generating means.

8. A function generator for producing an output voltage representing a predetermined function of a plurality of applied input voltages comprising in combination, a feedback amplifier having an input and an output, a first pair of input terminals adapted for receiving applied first and second voltages, a second pair of input terminals adapted for receiving applied third and fourth voltages, first voltage divider means coupled between said first pair of terminals and providing a plurality of output voltage connections, second voltage divider means coupled between said second pair of terminals and providing a plurality of output voltage connections, a series-coupled unilateral conductive device and impedance element coupled between each output voltage connection of said first voltage divider means and the input of said feedback amplifier, and means including a series-coupled unilateral conductive device and impedance element coupled between each output voltage connection of said second voltage divider means and the input of said feedback amplifier, said unilateral conductive devices coupled to said first voltage divider being oppositely polarized with respect to said unilateral conductive devices coupled to said second voltage divider.

9. The function generator as defined by claim 8 further comprising a first resistor means coupling one of said first pair of input terminals to the input of said feedback amplifier and comprising second resistor means coupling one of said second pair of input terminals to the input of said feedback amplifier.

References Cited in the file of this patent

UNITED STATES PATENTS

| | | |
|---|---|---|
| 2,419,852 | Owen | Apr. 29, 1947 |
| 2,557,070 | Berry | June 15, 1951 |
| 2,558,430 | Goldberg | June 26, 1951 |
| 2,595,185 | Zauderer et al. | Apr. 29, 1952 |
| 2,697,201 | Harder | Dec. 14, 1954 |
| 2,831,107 | Raymond et al. | Apr. 15, 1958 |

OTHER REFERENCES

Review of Scientific Instruments (Chance et al.), September 1951 (pages 684–685).

Catalog and Manual on GAP/R High-Speed All Electronic Analog Computors for Research and Design (Philbrick), page 19, December 1951.

Electronic Analog Computers (Korn and Korn), 1952 (pages 226–227 and 263).